Patented Feb. 27, 1951

2,543,312

UNITED STATES PATENT OFFICE 2,543,312

RESINOUS ACETALS AND PROCESS FOR PRODUCING AND HYDROLYZING THE SAME TO PRODUCE UNSATURATED ALDEHYDES

John W. Copenhaver, Easton, Pa., assignor to General Aniline & Film Corporation, New York, N. Y., a corporation of Delaware No Drawing. Application November 13, 1948, Serial No. 59,978

6 Claims. (Cl. 260—73)

This invention relates to a method of preparing $\alpha,\beta$-unsaturated aldehydes.

I have discovered that when an aldehyde is reacted with a vinyl ether in the presence of a Friedel-Crafts metallic halide catalyst such as boron trifluoride, there is obtained a somewhat resinous reaction product of an unknown composition which is apparently an acetal since on hydrolysis in acid solution, it yields an $\alpha,\beta$-unsaturated aldehyde of two more carbon atoms than were present in the original aldehyde and an alcohol corresponding to the alkyl group of the vinyl ether. In addition, smaller amounts of somewhat higher molecular weight and more highly unsaturated aldehydes containing two or more double bonds can be isolated from the products of the hydrolysis. While the exact mechanism of the reaction is not understood, the overall reaction may be formulated as follows:

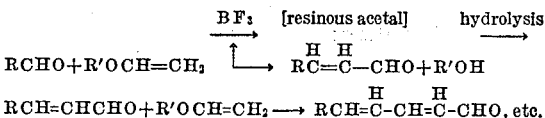

$$RCH=CHCHO + R'OCH=CH_2 \longrightarrow RCH=\overset{H}{C}-CH=\overset{H}{C}-CHO, \text{etc.}$$

wherein R and R' represent hydrocarbon radicals (i. e., alkyl, aryl or aralkyl), R preferably being aryl or aralkyl and R' preferably being alkyl (i. e. methyl, ethyl, propyl, butyl or amyl).

The present invention may be most readily described by first considering specific examples thereof.

Example I 636 grams (6 mols) of benzaldehyde and 0.375 ml. of boron trifluoride diethyl ether complex were charged to a 1-liter, 3-necked flask fitted with a sealed stirrer, thermometer and gas inlet tube. 148 grams (2.55 mols) of vinyl methyl ether were then slowly introduced through the gas inlet tube, while stirring the reaction mixture and maintaining the temperature within the range of 20–30° C. by intermittent cooling. There is thus obtained a light brown resinous product (boiling point 203° C.–204° C./2 mm.), Calculated 1:1 adduct $C_{10}H_{12}O_2$: C, 73.14; H, 7.37
Calculated dimer: 328 M. W.
Found: C, 73.01, H, 7.49
M. W.: 325 which was transferred to a distillation flask attached to a fractionating column and 5 grams of p-toluene sulfonic acid and 100 ml. of water were added thereto, and the mixture gradually heated. Methanol was formed in the reaction and was removed by distillation at a temperature of 60–64° C. as it was formed. The residue was then steam distilled until no more water-insoluble material came over.

The organic layer was then separated and the aqueous layer was extracted with chloroform and the combined organic layer and extract distilled. After removing the chloroform and unreacted benzaldehyde, there was obtained a good yield (about 60% of theory) of cinnamic aldehyde (boiling point 127–128° C.) at 14 mm., $n_D^{25}$ 1.6175.

The product was further characterized as cinnamic aldehyde by conversion to the phenyl hydrazone (melting point 168–169° C.). A mixed melting point with an authentic sample showed no depression.

Example II

A mixture of 300 grams of diethylacetaldehyde, 0.375 ml. of $BF_3O(C_2H_5)_2$ at 5–10° C. was treated with 89 grams of methyl vinyl ether. By treatment of the reaction mixture in a manner similar to that described in Example I, there was isolated:

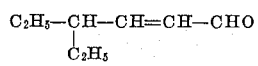

which was identified as its 2,4-dinitrophenylhydrazone (melting point 153–154° C.).

Analysis calculated for $C_{14}H_{18}N_4O_4$:
C 54.90; H 5.92; N 18.29
Found: C 54.71; H 5.77; N 17.78

In practicing the present invention, it has been found that the best yields were obtained when employing aromatic aldehydes, such as benzaldehyde, o-, m- and p-nitrobenzaldehyde, o-, m- and p-chlorobenzaldehyde, tolualdehyde, $\alpha$- and $\beta$-naphthaldehyde, p-methoxybenzaldehyde, p-bromobenzaldehyde, and the like, and therefore the process of this invention appears of greatest interest for the production of aromatic unsaturated aldehydes such as cinnamic aldehyde and the like. However, the process is operative and fair yields of $\alpha,\beta$-unsaturated aldehydes have been obtained when using aliphatic aldehydes such as propionaldehyde, ethyl butyraldehyde, and the like.

While substantially any vinyl ether may be employed in practicing the present invention, it is preferable to employ lower alkyl vinyl ethers such as methyl vinyl ether, ethyl vinyl ether, propyl vinyl ether, isopropyl vinyl ether, n-butyl vinyl ether, isobutyl vinyl ether, amyl vinyl ether, and the like, since the alcohol corresponding to the alcohol of the vinyl ether is formed in the hydrolysis reaction. Accordingly, the lower alkyl vinyl ethers, especially methyl and ethyl vinyl ethers which are less expensive than the higher vinyl ethers, are to be preferred in practicing this invention.

It has been found that in order to obtain a good yield of the desired unsaturated aldehyde, some excess of aldehyde should be employed in the reaction with vinyl ether. When the ratio of aldehyde to vinyl ether is within the range of 2:1 to 4:1, the best yield of the product has been obtained. While boron trifluoride and its ether complex are preferred as catalysts in the initial reaction of aldehyde and vinyl ether, other Friedel-Crafts type metallic halide catalysts such as gallium trichloride, stannic chloride, bismuth trichloride, antimony trichloride, aluminum chloride, and the like, may be used if desired. This initial reaction of aldehyde and vinyl ether may advantageously be carried out at temperatures of from 0-50° C.

The hydrolysis of the primary reaction product of aldehyde and vinyl ether may advantageously be carried out at the reflux temperature of the reaction mixture, in order to remove the alcohol formed in the reaction. However, somewhat lower temperatures may be employed if desired, satisfactory reaction rates being obtained at temperatures above about 50° C.

Substantially any acid reaction compounds may be employed during the hydrolysis. As examples of acidic substances which may be used may be mentioned mineral acid, such as hydrochloric, sulfuric or phosphoric acid, organic carboxylic acids such as acetic acid, organic sulfonic acids and acid reacting inorganic salts, such as zinc chloride, ammonium chloride, sodium acid sulfate and the like. Such acids need not be present in large amounts, amounts of from .1 to 1% by weight of the reaction mixture having been found satisfactory, although larger amounts up to 5% may be employed without adverse effect.

Preferably, some excess of water over the amount theoretically required for hydrolysis of the primary reaction product is employed during the hydrolysis, approximately double the theoretical quantity of water being preferably employed. Too large an amount of water, however, is preferably avoided, since it constitutes only an unnecessary load on the system.

I claim:

1. The process of producing $\alpha,\beta$-unsaturated aldehydes which comprises reacting a vinyl ether of the formula $R-O-CH=CH_2$ wherein R represents a hydrocarbon radical selected from the group consisting of alkyl, aryl and aralkyl with an aldehyde in the presence of the metallic halide Friedel-Crafts catalyst at a temperature of from 0-50° C. and then hydrolyzing the thus obtained primary reaction product in an acidic aqueous medium at a temperature in excess of 50° C. to obtain an $\alpha,\beta$-unsaturated aldehyde of two more carbon atoms than the original aldehyde.

2. The process as defined in claim 1, wherein the aldehyde employed is an aromatic aldehyde.

3. The process as defined in claim 1, wherein the metallic halide catalyst employed is boron trifluoride.

4. The process as defined in claim 1, wherein the vinyl ether specified is a lower alkyl vinyl ether.

5. The process as defined in claim 4, wherein the metallic halide catalyst specified is boron trifluoride.

6. A resinous product comprising the reaction product, formed in the presence of a Friedel-Crafts catalyst, of a vinyl ether of the formula $R-O-CH=CH_2$ wherein R represents a hydrocarbon radical selected from the group consisting of alkyl, aryl and aralkyl with a member of the class consisting of an aromatic and aliphatic aldehyde.

JOHN W. COPENHAVER.

REFERENCES CITED

The following references are of record in the file of this patent:

UNITED STATES PATENTS

| Number | Name | Date |
|--------|------|------|
| 2,104,000 | Reppe | Dec. 28, 1937 |
| 2,223,171 | Gaylor | Nov. 26, 1940 |